(12) United States Patent
Endo et al.

(10) Patent No.: US 7,181,558 B2
(45) Date of Patent: Feb. 20, 2007

(54) AVOIDANCE OF EXTENDED BUS OCCUPANCY THROUGH SIMPLE CONTROL OPERATION

(75) Inventors: Yoichi Endo, Kawasaki (JP); Naoki Ninagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 171 days.

(21) Appl. No.: 10/717,670

(22) Filed: Nov. 21, 2003

(65) Prior Publication Data

US 2004/0117530 A1 Jun. 17, 2004

(30) Foreign Application Priority Data

Nov. 27, 2002 (JP) .............. 2002-343657

(51) Int. Cl.
*G06F 13/00* (2006.01)
*H04L 12/40* (2006.01)
*G09G 3/36* (2006.01)

(52) U.S. Cl. .............. 710/113; 710/316; 710/111; 710/128; 345/438; 370/438

(58) Field of Classification Search ........... 710/113
See application file for complete search history.

(56) References Cited

U.S. PATENT DOCUMENTS

| | | | |
|---|---|---|---|
| 4,281,381 A * | 7/1981 | Ahuja et al. ............... 710/111 |
| 5,077,733 A * | 12/1991 | Whipple .................... 370/438 |
| 5,444,855 A | 8/1995 | Thompson | |
| 5,684,505 A * | 11/1997 | Takita et al. ............... 345/104 |
| 5,796,968 A * | 8/1998 | Takamiya ................... 710/113 |
| 5,845,097 A | 12/1998 | Kang et al. | |
| 5,956,493 A * | 9/1999 | Hewitt et al. .............. 710/113 |
| 6,205,524 B1 | 3/2001 | Ng | |
| 6,691,182 B2 * | 2/2004 | Kagemoto ................... 710/28 |
| 6,697,906 B1 * | 2/2004 | Ayukawa et al. ........... 710/316 |

FOREIGN PATENT DOCUMENTS

JP 2000-10914 1/2000

OTHER PUBLICATIONS

PCI Local Bus, "PCI Local Bus Specification," Production Version, Revision 2.1, Jun. 1, 1995, XP-002251932, pp. i-xvi, 1-282.

* cited by examiner

*Primary Examiner*—Paul R. Myers
*Assistant Examiner*—Brian Misiura
(74) *Attorney, Agent, or Firm*—Arent Fox PLLC

(57) ABSTRACT

A shared bus system includes a bus, a first circuit which accesses the bus, a second circuit which shares the bus with the first circuit, and accesses the bus, a counter circuit which is provided in the second circuit, and performs a counting operation each time the second circuit accesses the bus, and an arbiter circuit which arbitrates requests for a right to use the bus between the first circuit and the second circuit, wherein the second circuit releases the right to use the bus in response to detection of a predetermined number of counting operations performed by the counter circuit after acquiring the right to use the bus from the arbiter circuit.

15 Claims, 10 Drawing Sheets

AVOIDANCE OF EXTENDED BUS OCCUPANCY THROUGH SIMPLE CONTROL OPERATION

CROSS-REFERENCE TO RELATED APPLICATIONS

The present application is based upon and claims the benefit of priority from the prior Japanese Patent Application No. 2002-343657 filed on Nov. 27, 2002, with the Japanese Patent Office, the entire contents of which are incorporated herein by reference.

BACKGROUND OF THE INVENTION

1. Field of the Invention

The invention generally relates to shared bus systems, and particularly relates to a shared bus system in which a bus is released by avoiding extended bus occupancy.

2. Description of the Related Art

When a plurality of masters share a bus, a master in need of using the bus issues a request to an arbiter to request the right to use the bus. The arbiter arbitrates in response to requests from a plurality of masters, and grants the right to use the bus to a master that is selected according to priority.

One or more cycles are needed in order to perform the arbitration process as described above. It follows, therefore, that the arbitration process needs to be carried out each time a request is made if masters issue requests in a piecemeal manner, for example, resulting in the excessive use of cycles. Moreover, if a certain master holds on to the right to use the bus, and refuses to release it, other masters have no chance to use the bus. This results in a drop in system-wide performance.

A related-art document (Japanese Patent Application Publication No. 2000-010914) shows an arbitration controlling apparatus which controls the number of requests that can be processed consecutively with respect to a request signal, thereby shortening an excess processing time that would be needed at the time of switching request signals. According to this related-art document, a selected request signal is dropped to the lowest priority. However, a request holding signal corresponding to this request signal is asserted so as to process the same request signal consecutively despite its priority.

As an example of a method of preventing extended bus occupancy by a single master, an arbiter may monitor the state of the bus continuously, and take away the right to use the bus from the master if the bus occupancy continues more than a predetermined time period, or if a request from another master is detected. In order to achieve this, however, the arbiter circuit and circuitry on the master side need to exchange control signals, resulting in a complex circuit structure and complex control procedures. As a result, the number of cycles required for bus control may increase, and, under some circumstances, the system may be locked, resulting in a long period of suspended state.

Accordingly, there is a need for a shared bus system in which simple control operations by an arbiter and masters can prevent an extended state of bus occupancy.

SUMMARY OF THE INVENTION

It is a general object of the present invention to provide a shared bus system and a shared bus method that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a shared bus system and a shared bus method particularly pointed out in the specification in such full, clear, concise, and exact terms as to enable a person having ordinary skill in the art to practice the invention.

To achieve these and other advantages in accordance with the purpose of the invention, the invention provides a shared bus system, including a bus, a first circuit which accesses the bus, a second circuit which shares the bus with the first circuit, and accesses the bus, a counter circuit which is provided in the second circuit, and performs a counting operation each time the second circuit accesses the bus, and an arbiter circuit which arbitrates requests for a right to use the bus between the first circuit and the second circuit, wherein the second circuit releases the right to use the bus in response to detection of a predetermined number of counting operations performed by the counter circuit after acquiring the right to use the bus from the arbiter circuit.

In the invention described above, the counter circuit is provided in each master circuit (i.e., the second circuit), and the counter circuit performs a counting operation each time an access is made to the bus. The shared bus is released when a count indicated by the counter reaches the predetermined number. This provides for a simple control operation to prevent an extended state of bus occupancy.

Further, a method of sharing a bus according to the invention includes the steps of acquiring a right to use a shared bus by making a request, counting a number of accesses made to the shared bus after acquiring the right to use the shared bus, and releasing the shared bus in response to an event that the number of accesses reaches a predetermined number.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
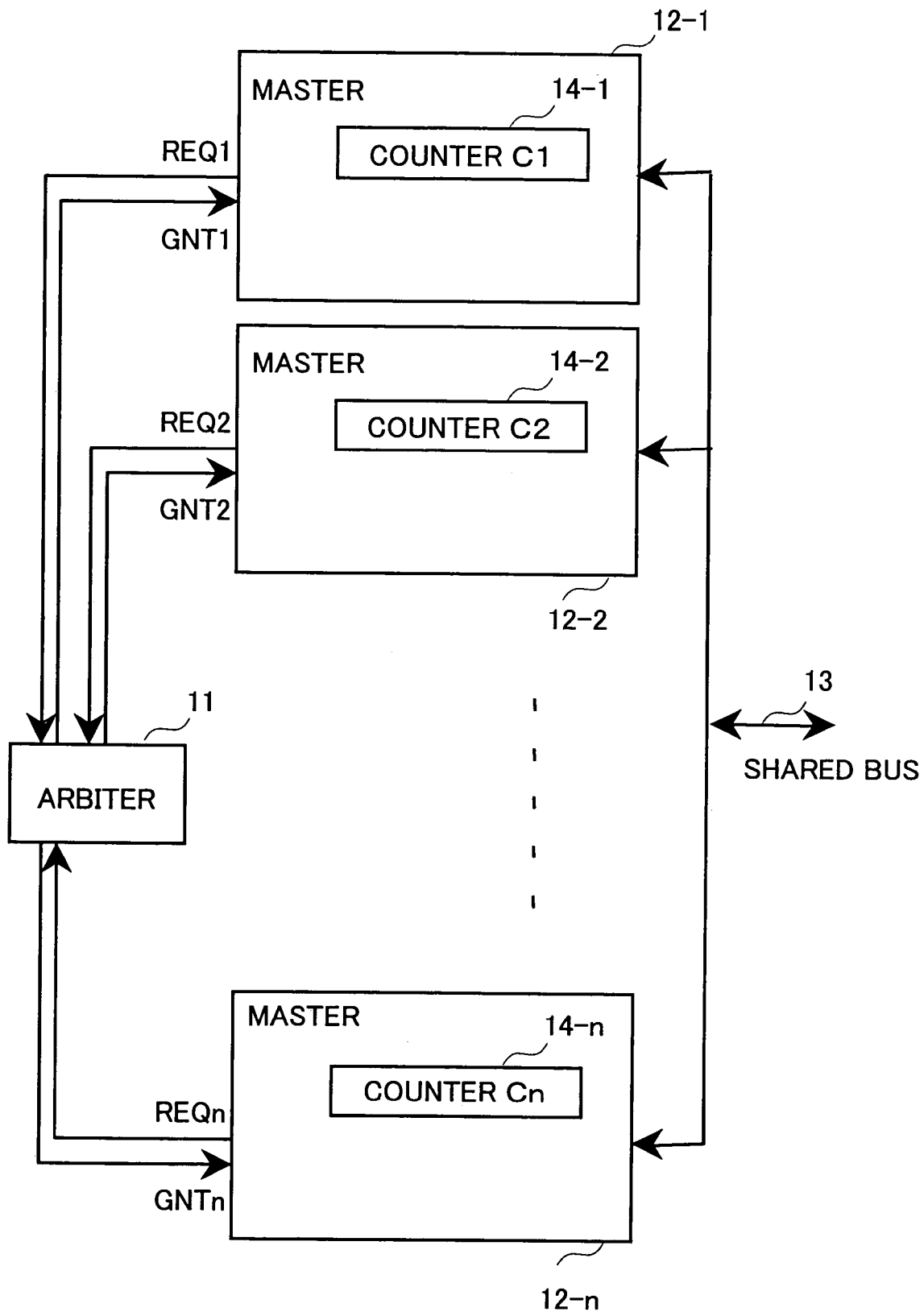
FIG. 1 is a drawing showing the construction of a shared bus system according to a first embodiment of the invention.

FIG. 1 is a drawing showing the construction of a shared bus system according to a first embodiment of the invention.

The shared bus system of FIG. 1 includes an arbiter 11, masters 12-1 through 12-n, and a shared bus 13. The masters 12-1 through 12-n are connected to the shared bus 13, and share the shared bus 13. When there is a need to use the shared bus 13, the masters 12-1 through 12-n transmit request signals REQ1 through REQn respectively, to the arbiter 11. The arbiter 11 asserts a grant signal GNTi (i=1, 2, ..., n) to a master to which the right to use the bus is granted. If there are two or more masters requiring the right to use the bus, the arbiter 11 selects a master according to predetermined priority so as to grant the right to use the bus to the selected master.

The masters 12-1 through 12-n include counters 14-1 through 14-n, respectively. When the grant signal GNTi is received from the arbiter 11, the master 12-i (i=1, 2, ..., n) occupies the shared bus 13 for performing a predetermined data transmission or the like. In the state in which a single master continues to occupy the shared bus 13, other masters cannot use the shared bus 13. If such state of occupancy continues an extended time period, system-wide performance will drop.

In the present invention, the counters 14-1 through 14-n are provided in the respective masters 12-1 through 12-n such that the state of bus occupancy by a given master does not continue more than a predetermined time length. Specifically, the master 12-i (i=1, 2, ..., n), when receiving the grant signal GNTi from the arbiter 11, occupies the shared bus 13 for carrying out predetermined data transmission or the like, and starts the counter 14-i from a preset initial value (e.g., 0), followed by adding one to the count each time accesses is made to the shared bus 13. The master 12-i checks a count Ci of the counter 14-i, and determines whether the count Ci has reached a predetermined value.

When the count Ci reaches the predetermined value, the master 12-i releases the shared bus 13, and negates the request signal REQi. Even if the count Ci has not reached the predetermined value, the master 12-i negates the request signal REQi supplied to the arbiter if the required access operation comes to an end. In response to the negation of the request signal REQi, the arbiter 11 learns that the shared bus 13 is released. When a new request signal arrives thereafter, the arbiter 11 asserts the grant signal to a master to which the right to use the bus is to be granted.

In the description provided above, the counter 14-i is counted up from a predetermined initial value (e.g., 0). Alternatively, numbers may be counted down from a predetermined initial value, and the shared bus 13 may be released when the count reaches zero.

Figure 2:
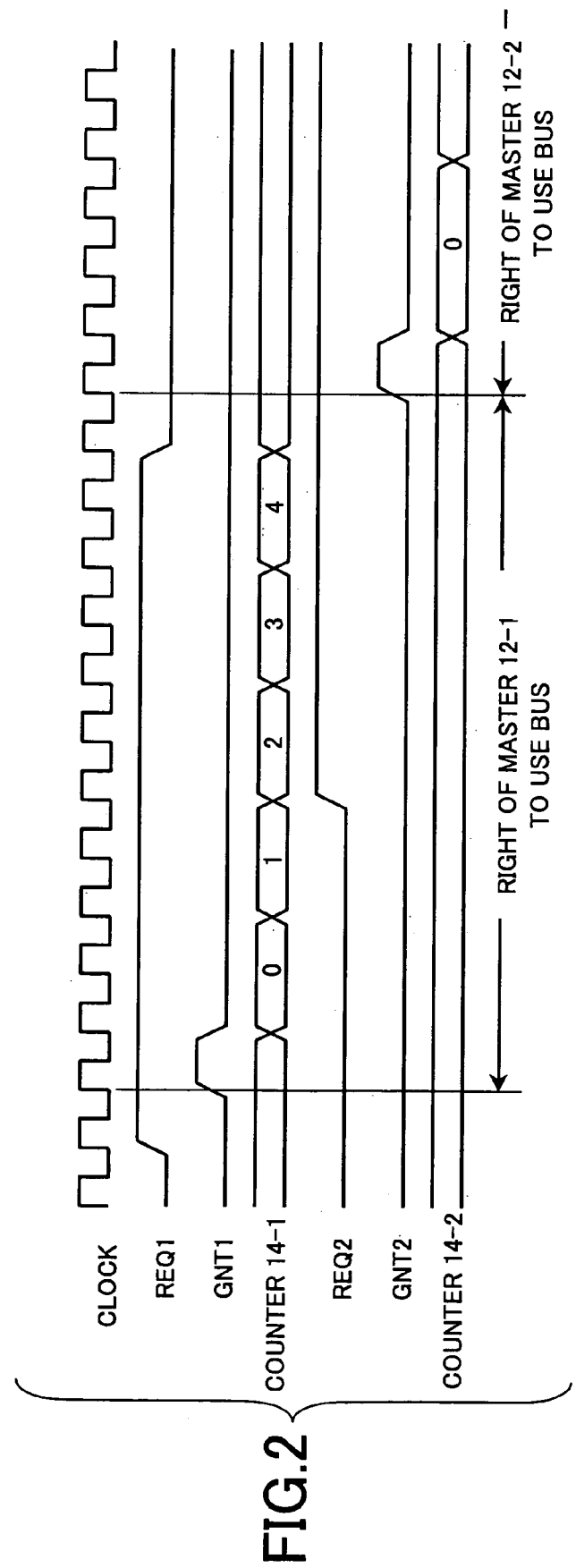
FIG. 2 is a timing chart showing an example of the operation of the shared bus system of FIG. 1.

FIG. 2 is a timing chart showing an example of the operation of the shared bus system of FIG. 1.

As the request signal REQ1 from the master 12-1 changes to HIGH, the arbiter 11 responds to such a change by asserting the grant signal GNT1 of the HIGH state for a limited period of one cycle. The master 12-1 resets the counter 14-1 to "0" in response to the assertion of the grant signal GNT1, thereby starting an access operation in respect to the shared bus 13. The master 12-1 makes the counter 14-1 count each time an access is made. When the count of the counter 14-1 reaches a predetermined value ("4" in this example), the master 12-1 negates the request signal REQ1.

In this example, the request signal REQ2 from the master 12-2 is HIGH when the count of the counter 14-1 is "2". At this point of time, however, the grant signal GNT2 is not asserted since the right to use the bus is occupied by the master 12-1. Thereafter, the master 12-1 negates the request signal REQ1. As it happens, the grant signal GNT2 directed to the master 12-2 becomes HIGH, and the right to use the bus is handed to the master 12-2.

In response to the assertion of the grant signal GNT2, the master 12-2 resets the counter 14-2 to "0", and start accessing the shared bus 13. In this example, the master 12-2 waits six cycles after the assertion of the request signal REQ2 before receiving the grant signal GNT2.

According to the first embodiment as described above, a counter circuit is provided in each master. The counter circuit performs a counting operation each time an access is made to the bus. When the count reaches a predetermined value, the shared bus is released, and the request signal to the arbiter is negated. With this provision, a simple control operation can prevent an extended state of bus occupancy.

Figure 3:
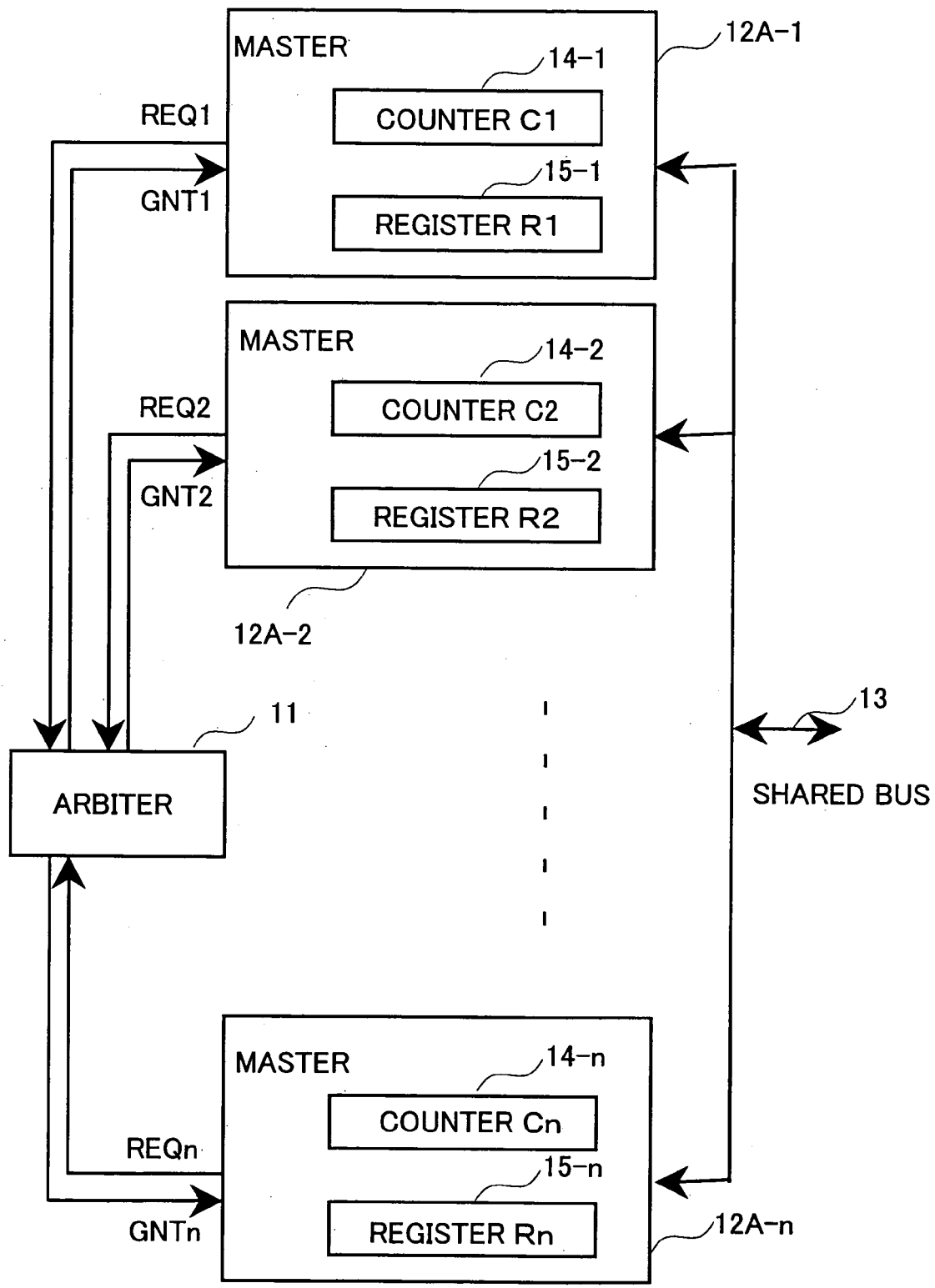
FIG. 3 is a drawing showing the construction of a shared bus system according to a second embodiment of the invention.

FIG. 3 is a drawing showing the construction of a shared bus system according to a second embodiment of the invention. In FIG. 3, the same elements as those of FIG. 1 are referred to by the same numerals, and a description thereof will be omitted.

The shared bus system of FIG. 3 includes the arbiter 11, masters 12A-1 through 12A-n, and the shared bus 13. The masters 12A-1 through 12A-n are connected to the shared bus 13, and share the shared bus 13.

The masters 12A-1 through 12A-n include the counters 14-1 through 14-n and registers 15-1 through 15-n, respectively. Upon receiving the grant signal GNTi from the arbiter 11, the master 12A-i (i=1, 2, ..., n) occupies the shared bus 13 for carrying out predetermined data transmission or the like, and starts the counter 14-i from a preset initial value (e.g., 0), followed by adding one to the count each time accesses is made to the shared bus 13. The master 12A-i checks the count Ci of the counter 14-i, and determines whether the count Ci is equal to a register value Ri stored in the register 15-i.

When the count Ci reaches the register value Ri, the master 12A-i releases the shared bus 13, and negates the request signal REQi. Even if the count Ci has not reached the register value Ri, the master 12A-i negates the request signal REQi supplied to the arbiter if the required access operation comes to an end.

In the description provided above, the counter 14-i is counted up from a predetermined initial value (e.g., 0). Alternatively, numbers may be counted down from a predetermined initial value, and the shared bus 13 may be released when the count reaches zero.

According to the second embodiment of the invention as described above, a counter circuit and a register circuit are provided in each master. The counter circuit performs a counting operation each time an access is made to the bus. When the count becomes equal to a value stored in the register circuit, the shared bus is released, and the request signal to the arbiter is negated. With this provision, a simple control operation can prevent an extended state of bus occupancy.

Moreover, the length of shared-bus occupancy by a single master (in terms of the number of cycles) is controlled by a register circuit. This makes it possible to adjust the length of shared-bus occupancy by each master according to the system's operation state. This further improves system-wide performance.

Figure 4:
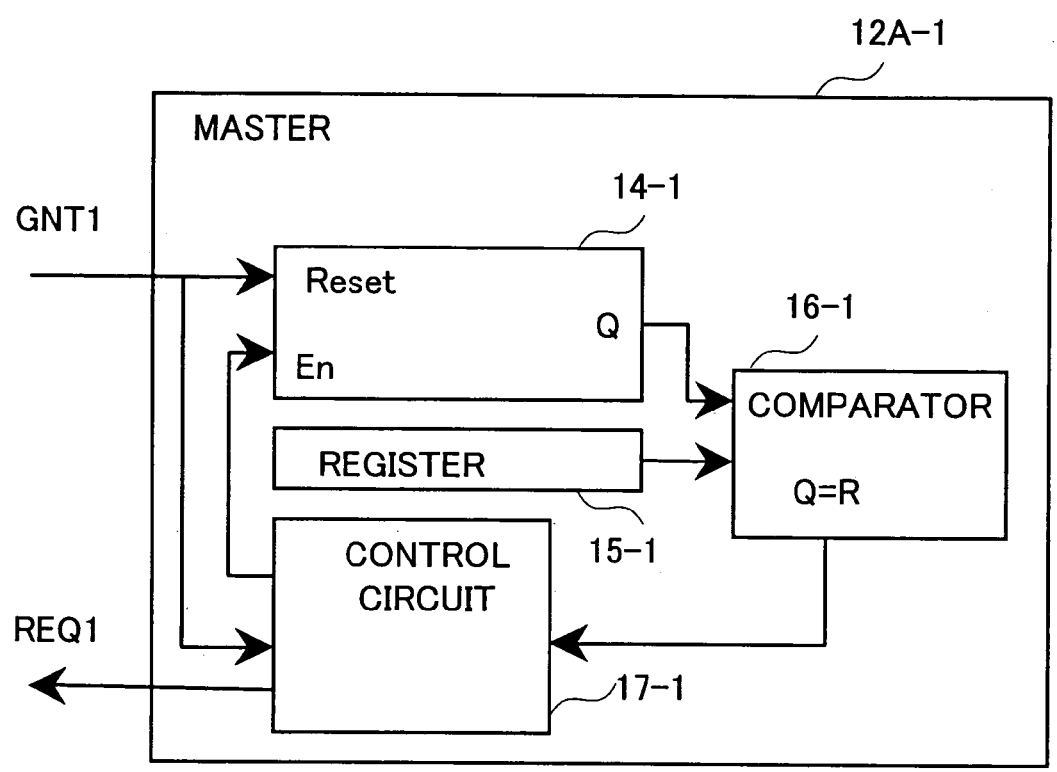
FIG. 4 is a drawing showing the construction of a relevant portion of a master.

FIG. 4 is a drawing showing the construction of a relevant portion of a master. The master 12A-1 is shown in FIG. 4 as an example, and the other masters 12A-2 through 12A-$n$ have the same construction.

The master 12A-1 of FIG. 4 includes the counter 14-1, the register 15-1, a comparator 16-1, and a control circuit 17-1. Further, the master 12A-1 includes a core circuit, which is not illustrated. The core circuit operates under the control of the control circuit 17-1 to perform access to the shared bus 13, predetermined data processing, etc. The core circuit may be provided as part of the control circuit 17-1.

The control circuit 17-1 sends the request signal REQ1 to the arbiter 11 when access to the shared bus 13 is required. When the grant signal GNT1 is supplied as a response from the arbiter 11, the grant signal GNT1 is input into the counter 14-1 and the control circuit 17-1. Having received the grant signal GNT1, the control circuit 17-1 starts access to the shared bus 13 for data transmission or the like. Moreover, the counter 14-1 is reset by the grant signal GNT1 to a predetermined initial value (e.g., "0").

The control circuit 17-1 supplies a pulse signal as an enable signal En to the counter 14-1 each time an access is made to the shared bus 13. In response to the enable signal En, the counter 14-1 increments its count by one for each access to the shared bus 13. The count of the counter 14-1 and the register value of the register 15-1 are supplied to the comparator 16-1, which then compares these values. When the count becomes equal to the register value, the comparator 16-1 asserts a comparison outcome signal to the control circuit 17-1. In response to the assertion of the comparison outcome signal, the control circuit 17-1 stops access to the shared bus 13 to release the shared bus 13, and negates the request signal REQ1 supplied to the arbiter 11.

Figure 5:
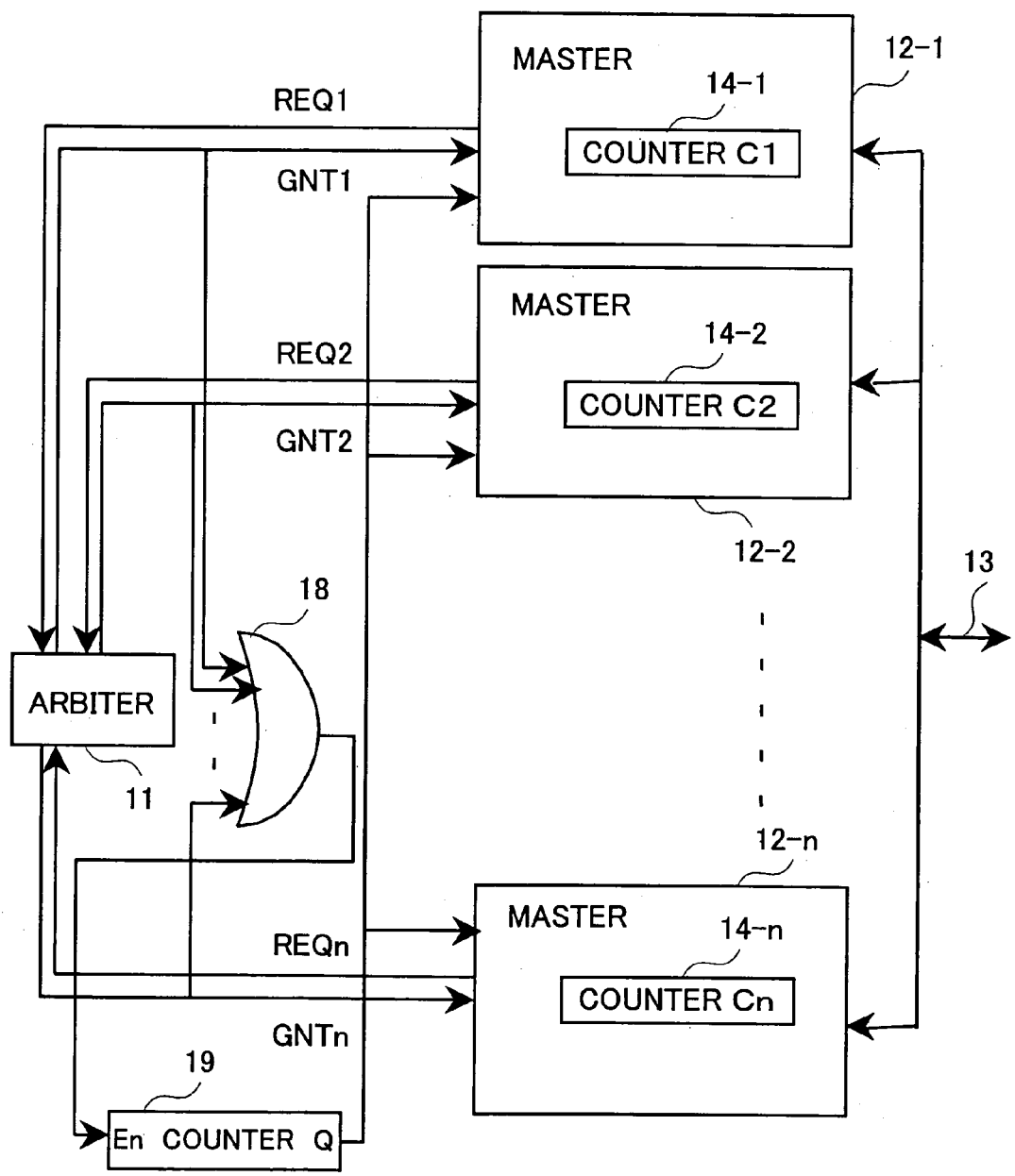
FIG. 5 is a drawing showing the construction of a shared bus system according to a third embodiment of the invention.

FIG. 5 is a drawing showing the construction of a shared bus system according to a third embodiment of the invention. In FIG. 5, the same elements as those of FIG. 1 are referred to by the same numerals, and a description thereof will be omitted.

The shared bus system of FIG. 5 includes the arbiter 11, the master 12-1 through 12-$n$, the shared bus 13, an OR circuit 18, and a counter 19. The masters 12-1 through 12-$n$ are connected to the shared bus 13, and share the shared bus 13.

The request signals REQ1 through REQn transmitted by the respective masters 12-1 through 12-$n$ are supplied to arbiter 11, and the grant signals GNT1 through GNTn are supplied to the OR circuit 18. The OR circuit 18 obtains a logic sum of the grant signals GNT1 through GNTn, and supplies its output to the counter 19. The counter 19 performs counting each time the signal from the OR circuit 18 is asserted. In other words, the OR circuit 18 counts up (or counts down) each time any one of the masters 12-1 through 12-$n$ carries out a request operation and is granted the right to use the bus. If a 4-bit counter is used, for example, numbers are counted in an ascending order from 1, and the count returns to 1 when it reaches 16. Alternatively, numbers are counted in a descending order from 16, and the count returns to 16 when it reaches 1.

Upon receiving the grant signal GNT1 from the arbiter 11, the master 12A-$i$ ($i$=1, 2, . . . , $n$) that has acquired the right to use the bus occupies the shared bus 13 for carrying out predetermined data transmission or the like, and starts the counter 14-$i$ from a preset initial value (e.g., 0), followed by adding one to the count each time accesses is made to the shared bus 13. The master 12-$i$ checks the count Ci of the counter 14-$i$, and determines whether the count Ci is equal to a count Ci of the counter 19.

When these counts become equal, the master 12-$i$ releases the shared bus 13, and negates the request signal REQi. Even if these counts are not equal, the master 12-$i$ negates the request signal REQi supplied to the arbiter if the required access operation comes to an end.

Figure 6:
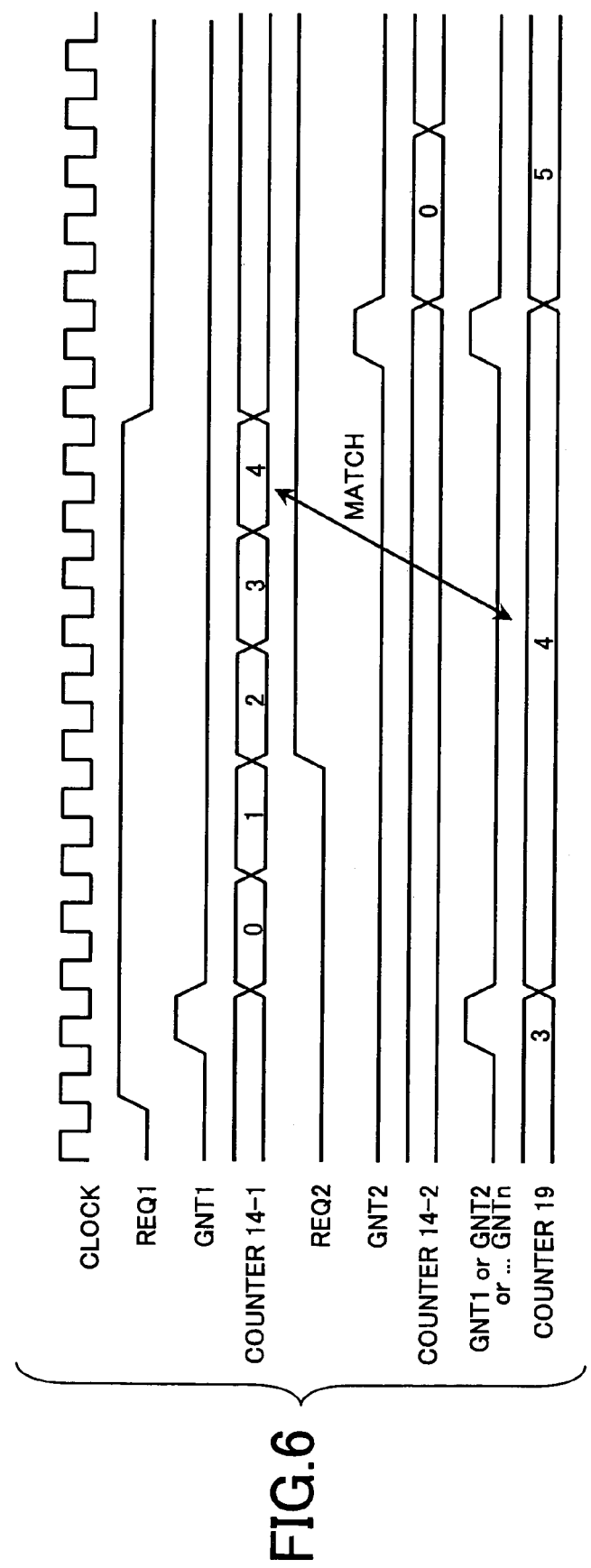
FIG. 6 is a timing chart showing an example of the operation of the shared bus system shown in FIG. 5.

FIG. 6 is a timing chart showing an example of the operation of the shared bus system shown in FIG. 5.

As the request signal REQ1 from the master 12-1 changes to HIGH, the arbiter 11 responds to such a change by asserting the grant signal GNT1 of the HIGH state for a limited period of one cycle. The master 12-1 resets the counter 14-1 to "0" in response to the assertion of the grant signal GNT1, thereby starting an access operation in respect to the shared bus 13. When this happens, the counter 19 counts up in response to a signal indicative of the logical sum of GNT1, GNT2, . . . , and GNTn. The master 12-1 makes the counter 14-1 count each time an access is made. When the count of the counter 14-1 reaches the count of the counter 19 ("4" in this example), the master 12-1 negates the request signal REQ1.

When the grant signal GNT2 directed to the master 12-2 is changed to HIGH thereafter, the counter 19 counts up again. The master 12-2 responds to the assertion of the grant signal GNT2 by resetting the counter 14-2 to "0", and starts accessing the shared bus 13. The master 12-2 counts up for each access after the resetting of the counter 14-2 to "0", and releases the shared bus 13 when the count of the counter 19 and the count of the counter 14-2 are equal to each other.

Through the operations described above, the number of consecutive accesses that are made by the masters 12-1 through 12-$n$ upon single acquisition of the right to use the bus varies with time according to the state of bus usage. With this provision, a proper number of consecutive accesses is automatically determined in the case where the priority of each master is unknown, for example. The masters 12A-1 through 12A-$n$ of FIG. 3 may be used in the configuration of FIG. 5. In such a case, the counters 14-1 through 14-$n$ may be compared either with the registers 15-1 through 15-$n$ or with the counter 19.

Figure 7:
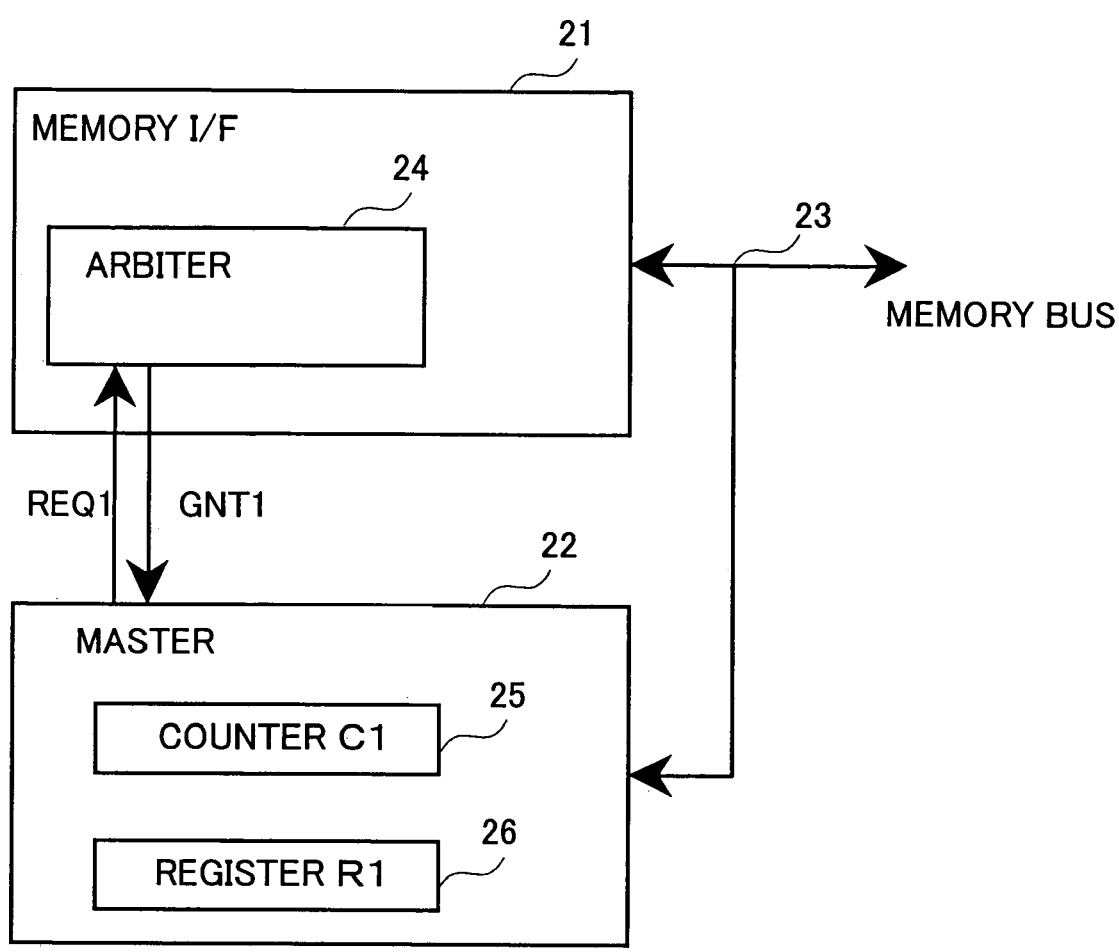
FIG. 7 is a drawing showing the construction of a shared bus system according to a fourth embodiment of the invention.

FIG. 7 is a drawing showing the construction of a shared bus system according to a fourth embodiment of the invention.

The shared bus system of FIG. 7 includes a memory interface 21, a master circuit 22, and a memory bus 23. The memory interface 21 receives data from a CPU or the like (not shown) for transmission to a memory (not shown) through the memory bus 23, and also receives data from the memory through the memory bus 23 for transmission to the CPU. The master circuit 22 shares the memory bus 23 with the memory interface 21, and uses the memory bus 23 for its own data input/output for the purpose of reducing the number of input/output pins of an LSI circuit, for example.

The memory interface 21 includes an arbiter 24. The master circuit 22 includes a counter 25 and a register 26.

The master circuit 22 asserts a request signal REQ1 to the arbiter 24 of the memory interface 21 when a need for use of the memory bus 23 arises. The arbiter 24 may ascertain that the memory interface 21 is not using the memory bus 23, which warrants the granting of the right to use the bus. In such a case, the arbiter 24 asserts the grant signal GNT1 to the master circuit 22.

Upon receiving the grant signal GNTi from the arbiter 24, the master circuit 22 occupies the memory bus 23 for carrying out predetermined data transmission or the like, and starts the counter 25 from a preset initial value (e.g., 0), followed by adding one to the count each time accesses is made to the memory bus 23. The master circuit 22 checks the count C1 of the counter 25, and determines whether the count C1 is equal to a register value R1 stored in the register 26.

When the count C1 reaches the register value R1, the master circuit 22 releases the memory bus 23, and negates the request signal REQ1. Even if the count C1 has not reached the register value R1, the master circuit 22 negates the request signal REQ1 supplied to the arbiter if the required access operation comes to an end.

In the description provided above, the counter 25 is counted up from a predetermined initial value (e.g., 0). Alternatively, numbers may be counted down from the register value R1, and the memory bus 23 may be released when the count reaches zero.

According to the fourth embodiment of the invention as described above, a counter circuit is provided in a master that shares the memory bus with a memory interface. The counter circuit performs a counting operation each time an access is made to the memory bus. When the count becomes equal to a predetermined value, the memory bus is released, and the request signal to the arbiter is negated. With this provision, a simple control operation can prevent an extended state of bus occupancy.

Figure 8:
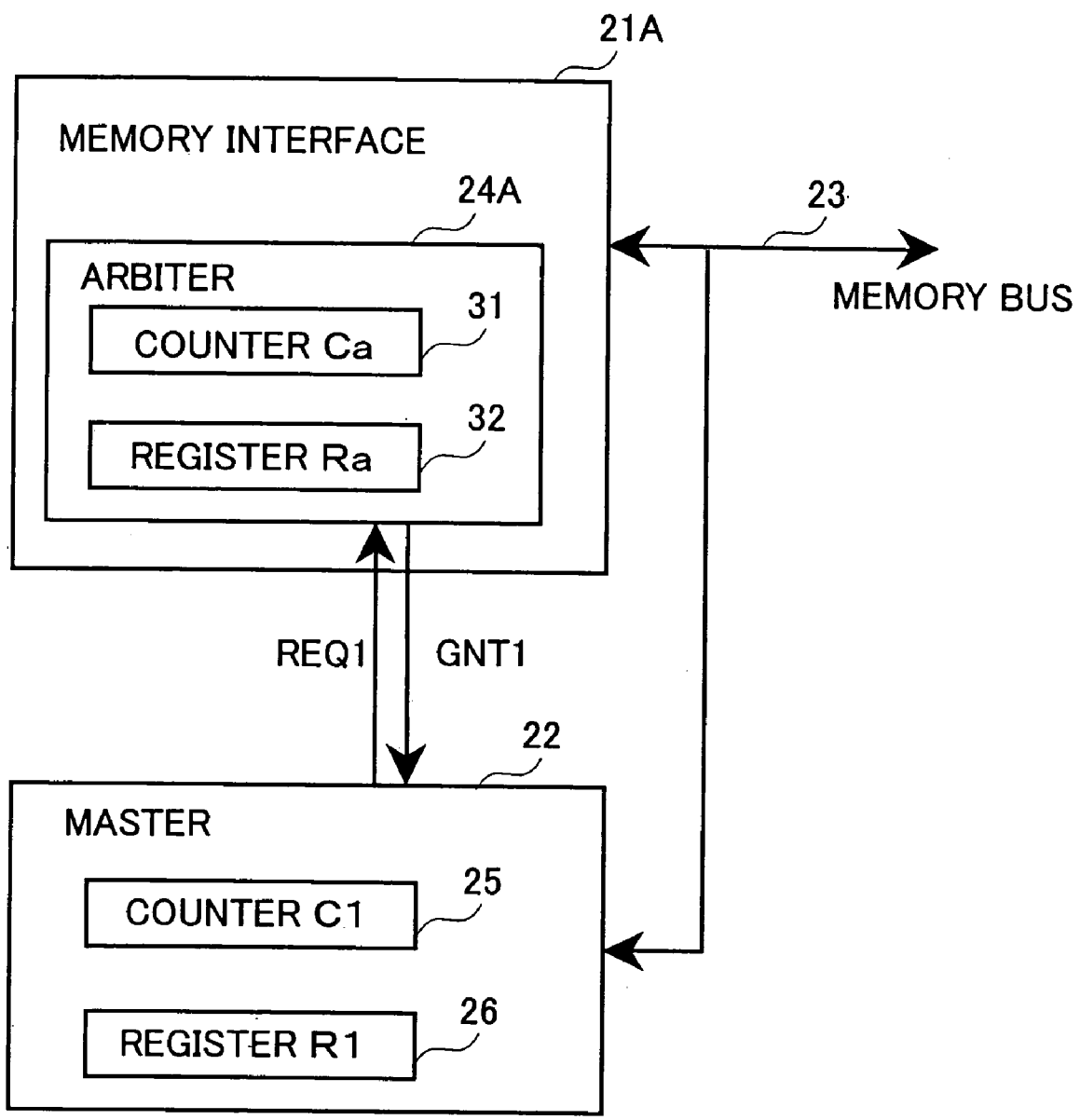
FIG. 8 is a drawing showing the construction of a shared bus system according to a fifth embodiment of the invention.

FIG. 8 is a drawing showing the construction of a shared bus system according to a fifth embodiment of the invention. In FIG. 8, the same elements as those of FIG. 7 are referred to by the same numerals, and a description thereof will be omitted.

The shared bus system of FIG. 8 includes a memory interface 21A, the master circuit 22, and the memory bus 23. Similar to the construction of FIG. 7, the memory interface 21A receives data from a CPU or the like (not shown) for transmission to a memory (not shown) through the memory bus 23, and also receives data from the memory through the memory bus 23 for transmission to the CPU.

Similar to the construction of FIG. 7, the memory interface 21A includes an arbiter 24A, and the master circuit 22 includes the counter 25 and the register 26. In the construction of FIG. 8, the arbiter 24A further includes a counter 31 and a register 32. The counter 31 performs counting operations based on a predetermined clock signal. The arbiter 24A compares a count Ca of the counter 31 with a value Ra stored in the register 32, and attends to arbitration such as not to accept a request from the master circuit 22 for the right to use the bus if the count Ca is larger than the register value Ra. Other operations are the same as those of the construction of FIG. 7.

Figure 9:
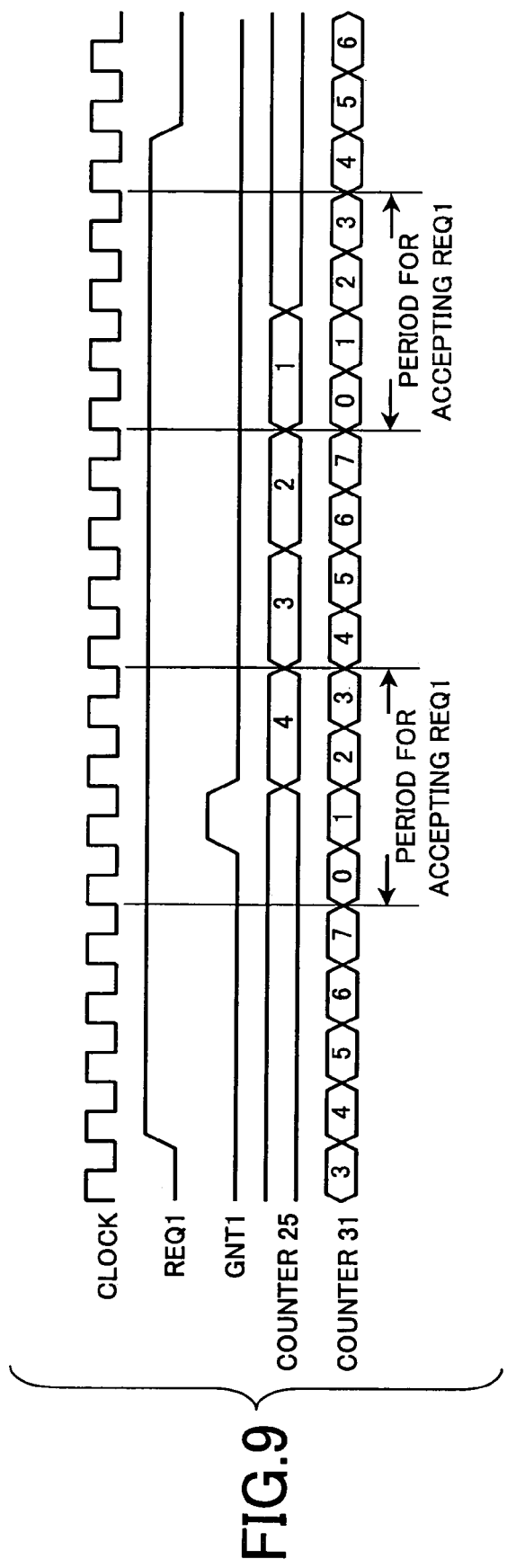
FIG. 9 is a timing chart showing an example of the operation of the shared bus system of FIG. 8.

FIG. 9 is a timing chart showing an example of the operation of the shared bus system of FIG. 8.

In this example, the value Ra stored in the register 32 is 3, and a request from the master circuit 22 is accepted only when the count Ca of the counter 31 ranges between 0 and 3. The counter 31 is a 3-bit counter, and its count is incremented to repeat counting between 0 and 7. In FIG. 9, the request signal REQ1 first changes to HIGH. When this happens, the arbiter 24A disregards a request because the count Ca does not fall within a range from 0 to 3. When the count Ca falls within the range of 0–3, the arbiter 24A accepts REQ1, and asserts the grant signal GNT1 of a HIGH level during one cycle period. In response, the master circuit 22 accesses an external device through the memory bus 23.

In the example of FIG. 9, the count C1 of the counter 25 is initially set to the register value R1 (4 in this example) of the register 26. When the counter 25 reaches zero through countdown, the master circuit 22 releases the memory bus 23, and negates the request signal REQ1 supplied to the arbiter 24A. In reverse order, the counter 25 may be counted up from zero, and the memory bus 23 may be released when the count C1 becomes equal to the register value R1.

In the fifth embodiment of the invention described above, a counter is provided in the arbiter, and a count indicated by this counter is used to control a time period for accepting a request from a master circuit. This makes it possible to limit the frequency of occurrence of memory-bus occupancy by the master circuit, thereby achieving an arbitration process that does not interfere with the memory interface when it performs data transmission for a memory device.

Figure 10:
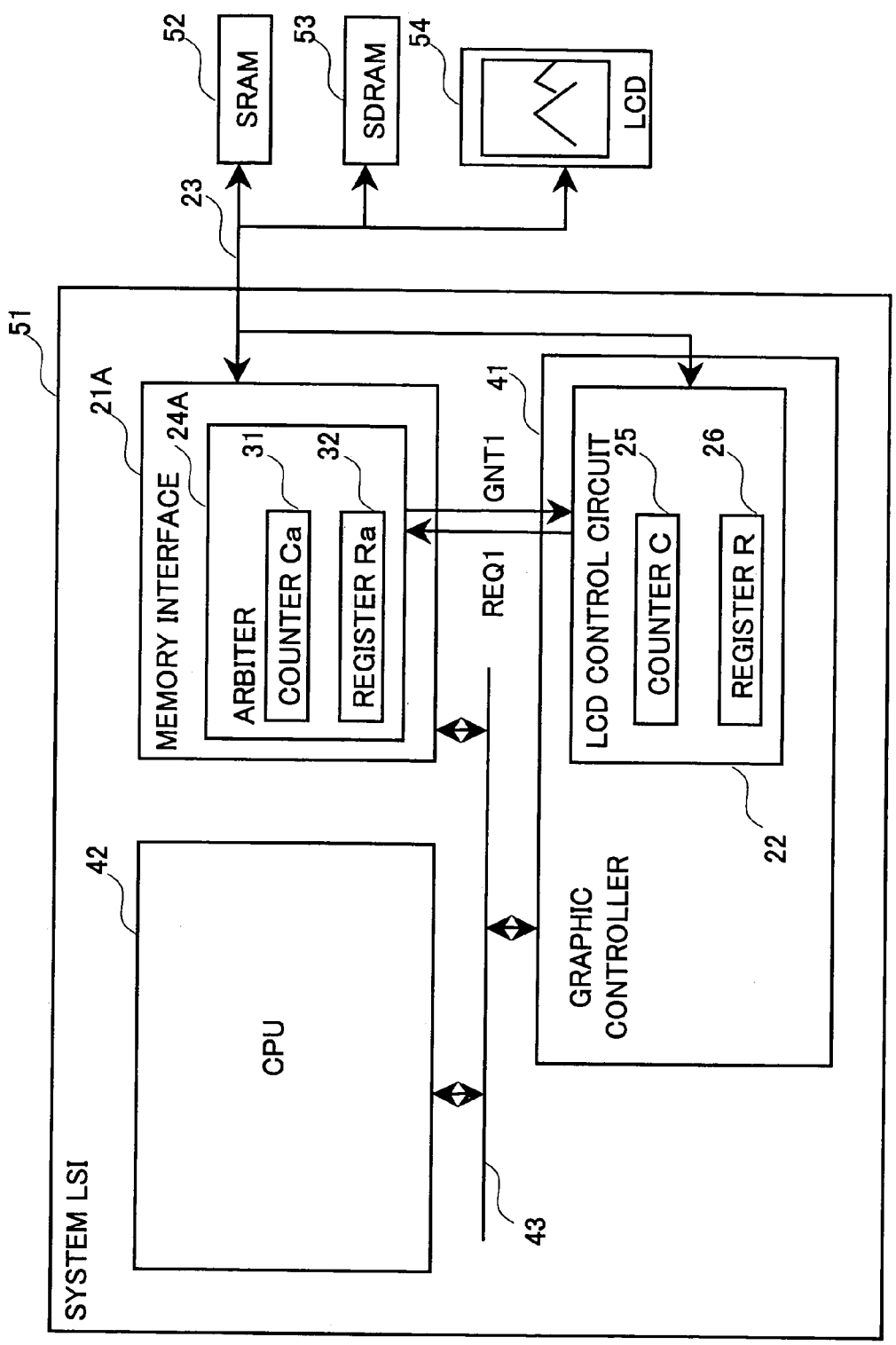
FIG. 10 is a block diagram showing an example of the shared bus system of FIG. 8 as applied to an LCD drive system.

FIG. 10 is a block diagram showing an example of the shared bus system of FIG. 8 as applied to an LCD drive system. In FIG. 10, the same elements as those of FIG. 8 are referred to by the same numerals, and a description thereof will be omitted.

The LCD drive system of FIG. 10 includes a system LSI 51, an SRAM (static random access memory) 52, an SDRAM (synchronous dynamic random access memory) 53, and an LCD (liquid crystal display) device 54. The system LSI 51 is connected to the SRAM 52, the SDRAM 53, and the LCD device 54 through the memory bus 23. The system LSI 51 includes the memory interface 21A, a graphic controller 41, a CPU 42, and an internal bus 43. The memory interface 21A corresponds to the memory interface 21A shown in FIG. 8, and the LCD control circuit 22 included in the graphic controller 41 is equivalent to the master circuit 22 of FIG. 8.

The memory interface 21A receives data from the CPU 42 through the internal bus 43, and supplies the data to the SRAM 52 or the SDRAM 53 through the memory bus 23. Furthermore, the memory interface 21A receives data from the SRAM 52 or the SDRAM 53 through the memory bus 23, and supplies the data to the CPU 42 through the internal bus 43. The LCD control circuit 22 shares the memory bus 23 with the memory interface 21A, and uses the memory bus 23 for data input/output relating to LCD display for the purpose of reducing the number of input/output pins of the system LSI 51.

The operation of the memory interface 21A and the LCD control circuit 22 is the same as that of the construction shown in FIG. 8. When there is a need to use the memory bus 23 to drive the LCD device 54, the LCD control circuit 22 asserts a request signal REQ1 to the arbiter 24 of the memory interface 21A. The arbiter 24A may ascertain that the memory interface 21A is not using the memory bus 23, and that a count indicated by the counter 31 falls within a predetermined range. In such a case, the arbiter 24A asserts a grant signal GNT1 to the LCD control circuit 22. Subsequent operations are the same as those described in connection with FIG. 8 and FIG. 9.

Further, the present invention is not limited to these embodiments, but various variations and modifications may be made without departing from the scope of the present invention.

What is claimed is:

1. A shared bus system, comprising:
   a bus;
   a first circuit coupled to said bus to access said bus;
   a second circuit coupled to said bus to share said bus with said first circuit, and to access said bus;
   a counter circuit which is provided in said second circuit, and performs a counting operation each time said second circuit accesses said bus; and an arbiter circuit coupled to said bus, said first circuit, and said second circuit to receive requests for a right to use said bus from said first circuit and said second circuit and to arbitrate the requests between said first circuit and said second circuit, wherein said second circuit releases the right to use said bus in response to detection of a predetermined number of counting operations performed by said counter circuit after acquiring the right to use said bus from said arbiter circuit, and wherein said second circuit releases the right to use said bus when a required access operation comes to an end even before said counter circuit performs the predetermined number of counting operations.

2. The shared bus system as claimed in claim 1, wherein said second circuit includes a register circuit, and the predetermined number is equal to a value stored in said register circuit.

3. The shared bus system as claimed in claim 2, wherein said second circuit includes:
- a comparator which makes a comparison of a count indicated by said counter circuit with the value stored in said register circuit; and
- a control circuit which notifies said arbiter circuit of the releasing of the right to use said bus according to the comparison by said comparator.

4. The shared bus system as claimed in claim 1, further comprising a second counter circuit which performs a counting operation each time the right to use said bus is granted from said arbiter circuit, and the predetermined number is a count indicated by said second counter circuit.

5. The shared bus system as claimed in claim 1, wherein said arbiter circuit disregards a request for the right to use said bus from said second circuit during a predetermined time period.

6. The shared bus system as claimed in claim 5, wherein said arbiter circuit includes a second counter circuit which performs a counting operation at predetermined intervals, and said predetermined time period is defined by a period during which a count indicated by said second counter circuit falls within a predetermined range.

7. The shared bus system as claimed in claim 1, wherein said bus is a memory bus to which a memory is connected, and said first circuit is a memory interface which accesses said memory through said memory bus.

8. The shared bus system as claimed in claim 1, wherein said second circuit is a liquid crystal display controlling circuit which controls driving of a liquid crystal display device through said memory bus.

9. A method of sharing a bus, comprising the steps of:
- sending to an arbiter circuit a request to grant a right to use a shared bus;
- arbitrating at the arbiter circuit if a plurality of requests for the right to use the shared bus are made;
- acquiring the right to use the shared bus from the arbiter circuit in response to the request;
- counting a number of accesses made to the shared bus after acquiring the right to use the shared bus;
- releasing the shared bus in response to an event that the number of accesses reaches a predetermined number; and
- releasing the right to use said shared bus when a required access operation comes to an end even before the number of accesses reaches the predetermined number.

10. The method as claimed in claim 9, further comprising a step of storing a value in a register circuit, and the predetermined number is equal to the value stored in said register circuit.

11. The method as claimed in claim 10, further comprising the steps of:
- making a comparison of the counted number with the value stored in said register circuit; and
- notifying an arbiter circuit of the releasing of the right to use said shared bus according to the comparison.

12. The method as claimed in claim 9, further comprising a step of performing a counting operation each time the right to use said shared bus is granted, and the predetermined number is a count indicated by the counting operation.

13. The method as claimed in claim 9, further comprising a step of disregarding a request for the right to use said shared bus during a predetermined time period.

14. The method as claimed in claim 13, further comprising a step of performing a counting operation at predetermined intervals, and said predetermined time period is defined by a period during which a count indicated by said counting operation falls within a predetermined range.

15. The method as claimed in claim 9, wherein said bus is a memory bus to which a memory is connected, and a memory interface for accessing said memory through said memory bus shares said memory bus together with a liquid crystal display controlling circuit for controlling driving of a liquid crystal display device through said memory bus.

* * * * *